United States Patent [19]

Furuno et al.

[11] Patent Number: 4,894,661
[45] Date of Patent: Jan. 16, 1990

[54] FISH SCHOOL DETECTING METHOD OR APPARATUS

[75] Inventors: Kiyotaka Furuno; Hidetoshi Tanigaki, both of Nishinomiya; Kouji Yano, Itami; Tadashi Ozaki, Kobe; Yoshihisa Fukuda, Kawanishi; Takumi Fujikawa, Takarazuka; Makoto Tanaka, Nishinomiya, all of Japan

[73] Assignee: Furuno Electric Company, Limited, Hyogo, Japan

[21] Appl. No.: 40,797

[22] Filed: Apr. 21, 1987

[30] Foreign Application Priority Data

Apr. 23, 1986 [JP] Japan .................................. 61-94164
Apr. 28, 1986 [JP] Japan .............................. 61-64918[U]

[51] Int. Cl.$^4$ ............................................ G01S 13/06
[52] U.S. Cl. ........................................ 342/140; 43/17
[58] Field of Search ........................... 43/4.5, 17, 17.1; 342/181, 177, 140; 343/784, 872

[56] References Cited

U.S. PATENT DOCUMENTS

| 3,114,907 | 12/1963 | Luftman et al. | 342/181 |
| 3,427,626 | 2/1969 | Losee | 343/872 |
| 4,038,658 | 7/1977 | Nelson et al. | 342/181 X |
| 4,199,764 | 4/1980 | Williams et al. | 343/786 |
| 4,318,101 | 3/1982 | Musha et al. | 342/162 X |

OTHER PUBLICATIONS

"The American Heritage Dictionary", Houghton Mifflin Company; 1982; p. 916.

Primary Examiner—Thomas H. Tarola
Assistant Examiner—Tod Swann
Attorney, Agent, or Firm—Birch, Stewart, Kolasch & Birch

[57] ABSTRACT

A fish school detecting method or apparatus radiates radio search signals with their carrier frequency in the S-band frequency range, successively in different azimuthal directions through a wide angular range, receives echo signals, and displays the echo signals on the screen of an indicator in such a manner that the echo signal reflected by a bird is clearly distinguished from the other objects, thereby locating the bird and detecting a fish school under the bird.

18 Claims, 6 Drawing Sheets

FISH SCHOOL DETECTING METHOD OR APPARATUS

BACKGROUND OF THE INVENTION

The present invention relates to a method or an apparatus for detecting fish schools of, for example, bonito, yellow-tail, a hair-tail, sardine, mackerel or tuna moving close to the surface of the water. Fish schools of these kinds are detected by locating a bird or birds such as a sea swallow or a booby gannet, etc., flying thereover.

A prior art method has used a pair of binoculars to find the birds. The prior method has presented the following disadvantages:

(1) The detectability of birds by the use of a pair of binoculars is limited to within the range of 6 or 7 miles, even under the most favourable weather conditions.

(2) The birds can not be found in rainy weather, in a dark environment or in dense fog.

(3) Close collaboration is required between the observer of the birds and the ship operator, when the birds found are followed.

(4) When a plurality of groups of the birds are found, the judgement to follow which group of the birds first is difficult to make, since the range to the discovered birds from the ship can not be accurately measured.

SUMMARY OF THE INVENTION

Accordingly, an object of the present invention is to provide a fish school detecting method or apparatus which is capable of solving all the problems mentioned above.

Another object of the invention is to provide a method or an apparatus for detecting a fish school, which radiates radio search signals of a carrier frequency in the S-band frequency range successively in different azimuthal directions within a wide angular range, receives an echo signal of the frequency reflected by a bird or birds, and displays the received echo signal on the screen of an indicator, thereby locating the bird or birds, and detecting a fish school under the bird or birds.

Another object of the invention is to provide a method or an apparatus for detecting a fish school, which radiates radio search signals of a carrier frequency in the S-band frequency range successively in different azimuthal directions within a wide angular range, receives an echo signal of the frequency reflected by a bird or birds, stores in a memory unit the echo signals received during a plurality of rotations of the antenna, and displays the track of at least a bird on the screen of an indicator, thereby easily perceiving the bird clearly distinguished from the other objects to locate the bird and detecting a fish school under the bird.

Another object of the invention is to provide a method or an apparatus for detecting a fish school, which radiates radio search signals of a carrier frequency in the S-band frequency range successively in different azimuthal directions within a wide angular range, receives an echo signal of the frequency reflected by a bird or birds, accentuating the weak echo signal based on the echo signals received during a plurality of rotations of the antenna, and displays the stressed echo signal on the screen of an indicator, thereby easily distinguishing at least the bird from the other objects to locate the bird and detecting a fish school under the bird.

Another object of the invention is to provide a method or an apparatus for detecting a fish school, which has two independent antennas, where on antenna radiates radio search signals of a carrier frequency in the S-band frequency range and another antenna radiates search signals of another carrier frequency in the X-band frequency range respectively in different azimuthal directions within a wide angular range, the two independent antennas respectfully receiving echo signals of the two different carrier frequencies.

The method or apparatus displays the echo signals reflected by a bird or birds in a color different from other colors representing echo signals reflected by other objects, so that the bird or birds are clearly distinguished from the other objects and thus a fish school thereunder is easily detected.

A further object of the invention is to provide a an apparatus for detecting a fish school, which employs an antenna having improved directional characteristics and reduced in size.

The method or apparatus of the present invention radiates radio search signals, successively in different azimuthal directions within a wide angular range, receives an echo signal reflected by a bird or birds, and displays the received echo signals on the screen of an indicator, thereby locating the bird or birds and detecting a fish school under the bird or birds.

According to one aspect of the invention, a fish school detecting method successively radiates search signals with their carrier frequency being in the S-band frequency range from an antenna in different azimuthal directions within a wide angular range, receives an echo signal reflected by a bird, receives echo signals received during a plurality of rotations of the antenna so that the echo signals reflected by the bird are emphasized, and displays the resultant processed signals, thereby locating the bird and detecting a fish school under the bird.

According to another aspect of the invention, a fish school detecting apparatus comprises (i) transmitting means for radiating search signals of a carrier frequency in in the S-band frequency range, successively in different azimuthal directions within a wide angular range, (ii) receiving means for receiving an echo signal reflected by a bird, (iii) processing means for processing echo signals received during a plurality of rotations of the antenna, so that the echo signals reflected by the bird are emphasized, and (iv) an indicator for displaying the resultant processed signals on the screen thereof, thereby locating the bird and detecting a fish school under the bird.

DETAILED DESCRIPTION OF THE PREFERRED EMBODIMENTS

Figure 1:
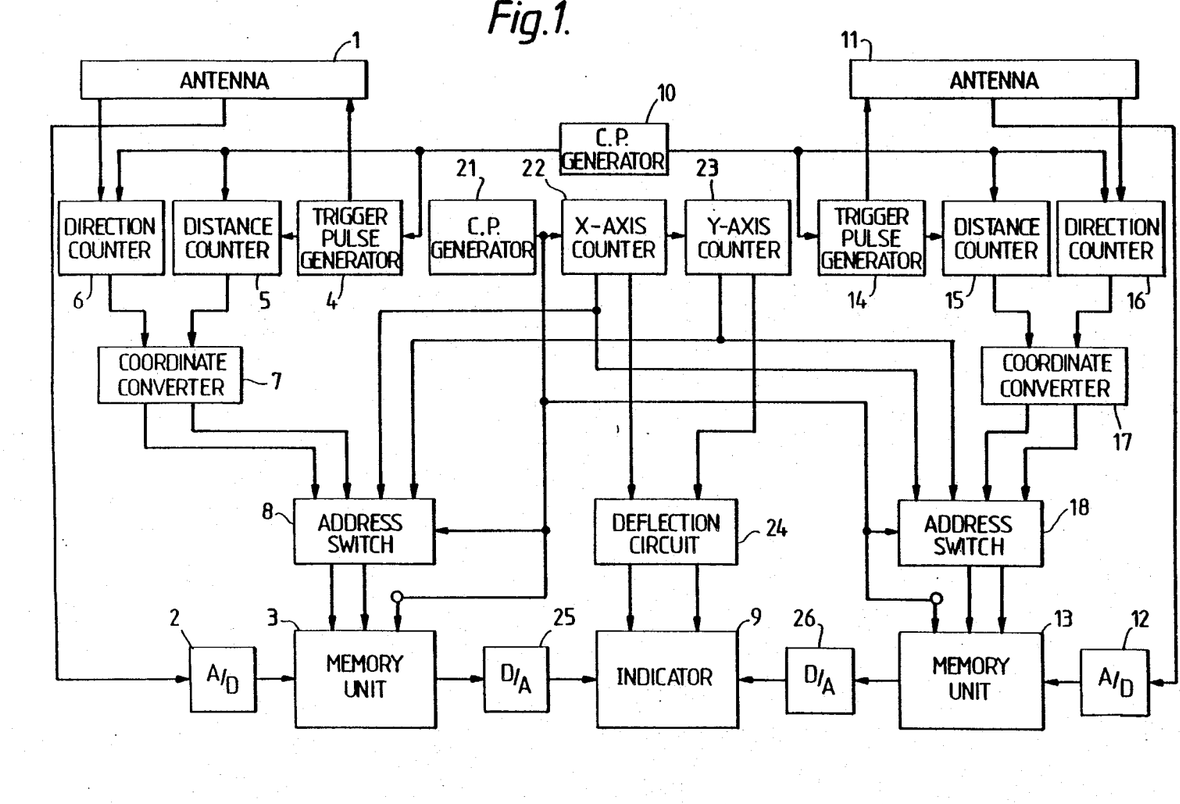
FIG. 1 shows a schematic block diagram of an embodiment of a fish detecting apparatus according to the present invention.

Referring to FIG. 1, an antenna 1 is rotated at a constant speed and radiates radio pulse signals of a frequency in the S-band frequency range successively in different azimuthal directions through 360 degrees, and receives echo signals of the S-band frequency reflected by objects. The received echo signals are supplied to an analog-to-digital converter 2 which converts the echo signals in an analog form to digital signals, and supplies them to the signal input terminal of a memory unit 3. A reference clock pulse generator 10 produces clock pulses with a predetermined repetition frequency and supplies the pulses to a transmission trigger pulse generator 4, and to one inputs of a distance counter 5 and a direction counter 6. The transmission trigger pulse generator 4 produces a transmission trigger pulse based on the clock pulses from the reference clock pulse generator 10, and supplies the trigger pulse to the antenna 1 and to the other input of the distance counter 5. The distance counter 5 starts in response to the trigger pulse to count the clock pulses from the reference clock pulse generator 10, and supplies its count value to one input of a coordinate converter 7, and is cleared to zero in count value every time its count reaches a count value corresponding to the detection range set. The direction counter 6 starts in response to a start signal supplied from the antenna 1 to count the clock pulses from the clock pulse generator 10, and supplies its count value to the other input of the coordinate converter 7, and is cleared to zero every time its count reaches a count value corresponding to an angle of 360 degrees. The coordinate converter 7 produces X- and Y-address signals based on the output signals from the distance counter 5 and the direction counter 6, and supplies these signals to the memory unit 3 through an address switch 8. The coordinate converter 7 is constructed in a known manner and is operated in a known way. The memory unit 3 includes m×n semiconductor RAM(random access memory) elements arranged in m columns and n rows, with the number of RAM elements being the same as that of the picture elements of the screen of a cathode-ray tube indicator 9 wherein the picture elements are also arranged in m columns and n rows. Each memory element of the memory unit 3 consists of, for example one bit. The memory unit 3 writes the output signal from the analog-to-digital converter 2(hereinafter referred to as "A-D converter") into the storage location determined by X- and Y-address signals supplied from the coordinate converter 7.

An antenna 11 is rotated at a constant speed and radiates radio pulse signals of a frequency in the X-band frequency range successively in different azimuthal directions through 360 degrees, and receives echo signals of the X-band frequency reflected by objects. The received echo signals are supplied to an analog-to-digital converter 12 which converts the echo signals in an analog form to digital signals, and supplies them to the signal input terminal of a memory unit 13. A reference clock pulse generator 10 produces clock pulses with a predetermined repetition frequency and supplies the pulses to a transmission trigger pulse generator 14, and to one input of each of a distance counter 15 and a direction counter 16. The transmission trigger pulse generator 14 produces a transmission trigger pulse based on the clock pulses from the reference clock pulse generator 10, and supplies the trigger pulse to the antenna 11 and to the other input of the distance counter 15. The distance counter 15 starts in response to the trigger pulse to count the clock pulses from the reference clock pulse generator 10, and supplies its count value to one input of a coordinate converter 17, and is cleared to zero in count value every time its count reaches a count value corresponding to the detection range set. The direction counter 16 starts in response to a start signal supplied from the antenna 11 to count the clock pulses from the clock pulse generator 10, and supplies its count value to the other input of the coordinate converter 17, and is cleared to zero every time its count reaches a count value corresponding to an angle of 360 degrees. The coordinate converter 17 produces X- and Y-address signals based on the output signals from the distance counter 15 and the direction counter 16, and supplies these signals to the memory unit 13 through an address switch 18. The construction and operation of the coordinate converter 17 is the same as the converter 7. The memory unit 13 includes m×n semiconductor RAM(random access memory) elements arranged in m columns and n rows, with the number of RAM elements being the same as that of the picture elements of the screen of a cathode-ray tube indicator 9. Each memory element of the memory unit 13 consists of, for example one bit. The memory unit 13 writes the output signal from the analog-to-digital converter 12 (hereinafter referred to as "A-D converter") into the storage location determined by X- and Y-address signals supplied from the coordinate converter 17.

A clock pulse generator 21 supplies clock pulses to an X-axis counter 22, the address switch 8, the read/write terminal of the memory unit 3, the address switch 18 and the read/write terminal of the memory unit 13. The X-axis counter 22 repetitiously counts m clock pulses and transmits and output pulse to a Y-axis counter 29 every time its count reaches m, and supplies its count to the memory unit 3 through the address switch 8 and also to the memory unit 13 through the address switch 18, and further supplies horizontal synchronous signals to a deflection circuit 24. The Y-axis counter 23 repetitiously counts n clock pulses, supplies its count to the memory unit 3 through the address switch 8 and also to the memory unit 13 through the address switch 18, and further supplies vertical signals to a deflection circuit 24. The memory unit 3 reads a stored signal from the memory element determined by the count outputs from the X-axis and Y-axis counters 22 and 23. The address switch 8 comprises an electric switching device, and supplies either the X- and Y-address signals from the coordinate converter 7 or the counts from the X-axis and Y-axis counters 22 and 23 depending on the polarity of the clock pulses from the clock pulse generator 21. When the X- and Y-address signals from the coordinate converter 7 are supplied to the memory unit 3 and a write signal is applied to the read/write terminal of the memory unit 3 from the clock pulse generator 21, the output signal from the A-D converter 7 is written into a memory element determined by the X- and Y-address signals. On the other hand, when the count outputs from the X-axis and Y-axis counters 22 and 23 are supplied to the memory unit 3 through the address switch 8 and a read signal is applied to the read/write terminal of the memory unit 3, the stored signal is read out from the memory element determined by the count outputs from the X-axis and Y-axis counters 22 and 23 and supplied to the red input terminal of the color indicator 9 through a digital-to-analog converter 25 (hereinafter referred to as "D-A converter"). The memory unit 13 reads a stored signal from the memory element determined by the count outputs from the X-axis and Y-axis counters 22 and 23. The address switch 18 is constructed in the same way as the address switch 8, and supplies either the X- and Y-address signals from the coordinate converter 17 or the counts from the X-axis and Y-axis counters 22 and 23 depending on the polarity of the clock pulses from the clock pulse generator 21. When the X- and Y-address signals from the coordinate converter 17 are supplied to the memory unit 13 and a write signal is applied to the read/write terminal of the memory unit 13 from the clock pulse generator 21, the output signal from the A-D converter 12 is written into a memory element determined by the X- and Y-address signals. On the other hand, when the count outputs from the X-axis and Y-axis counters 22 and 23 are supplied to the memory unit 13 through the address switch 18 and a read signal is applied to the read/write terminal of the memory unit 3, the stored signal is read out from the memory element determined by the count outputs from the X-axis and Y-axis counters 22 and 23 and supplied to the green input terminal of the color indicator 9 through a D-A converter 26. The red and green guns of electron beams of the color cathode-ray tube indicator 9 are respectively controlled by the output signals from the D-A converters 25 and 26. The electron beams of the indicator 9 are deflected horizontally in synchronism with the horizontal synchronous signals and also deflected vertically in synchronism with the vertical synchronous signals, so that the whole surface of the cathode-ray tube indicator 9 is swept.

Figure 2A:
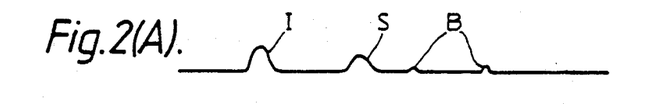
FIG. 2 shows waveforms for explaining the operation of the fish detecting apparatus shown in FIG. 1.
Figure 2B:
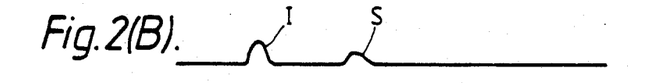

Referring to FIG. 2, FIG. 2(A) represents echo signals of the S-band carrier frequency caught by the antenna 1, and FIG. 2(B) represents echo signals of the X-band carrier frequency caught by the antenna 11. Here, I denotes an echo signal reflected by an island, S represents an echo signal from a ship, and B denotes echo signals reflected by birds. As seen in FIG. 2, it has been discovered that the echo signals of the S-band carrier frequency reflected by birds are caught and produced by the antenna 1 for signals of the S-band carrier frequency, and the echo signals of the X-band carrier frequency reflected by the birds are not sufficiently large to be easily received and produced by the antenna 11 for signals of the X-band carrier frequency. The echo signals shown in FIG. 2(A) are supplied to the memory unit 3 from the antenna 1 through the A-D converter 2 and stored one-time in the memory 3. The echo signals shown in FIG. 2(B) are supplied to the memory unit 13 from the antenna 11 through the A-D converter 12 and stored one-time in the memory 13. The output signals of the memory unit 3 are supplied to the red input terminal of the color indicator 9 through the D-A converter 25, while the output signals of the memory unit 13 are supplied to the green input terminal thereof through the D-A converter 26. As a result, the island I and ship S are indicated in yellow, a combination color of red and green. While, the echo signals representing birds are displayed in red. Thus, the bird or birds are displayed conspicuously as clearly distinguished from the other objects.

Figure 3:
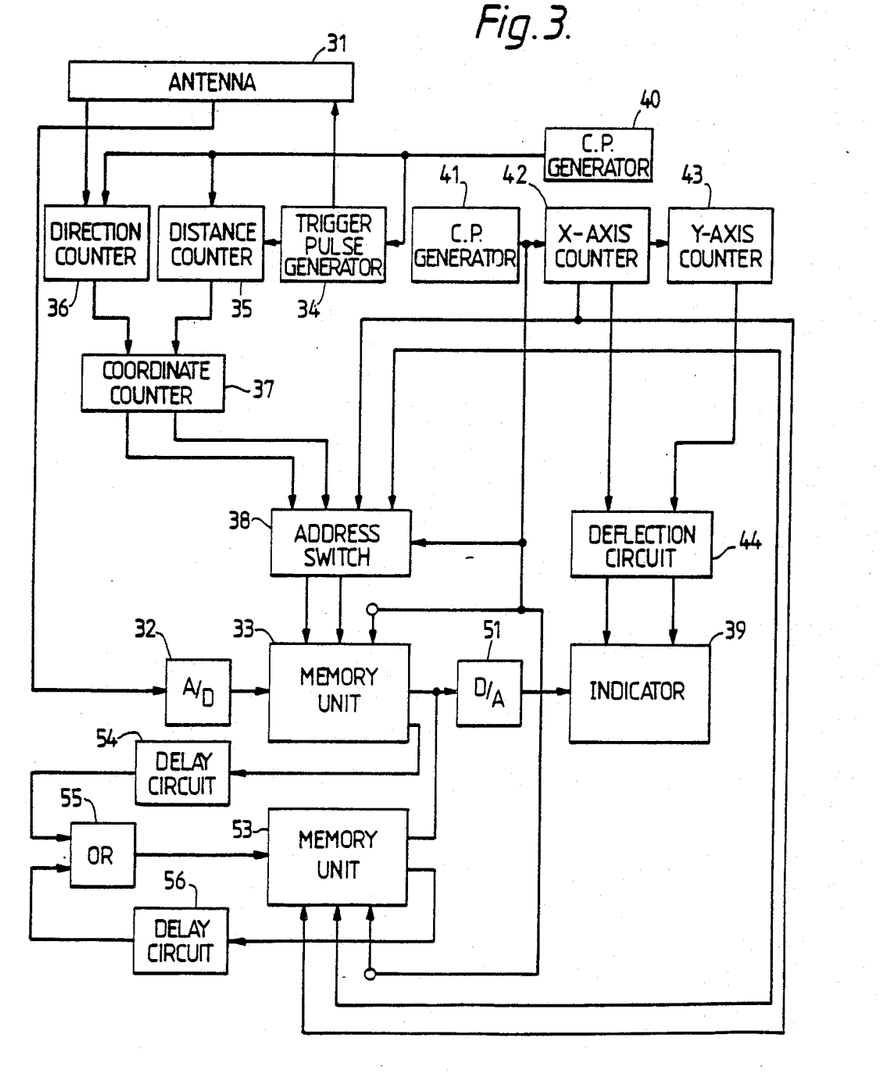
FIG. 3 shows a schematic block diagram of another embodiment according to the invention.

Referring to FIG. 3, an antenna 31 is rotated at a constant speed and radiates radio pulse signals of a frequency in the S-band frequency range successively in different azimuthal directions through 360 degrees, and receives echo signals of the S-bnand frequency reflected by objects. The received echo signals are supplied to an analog-to-digital converter 32 which converts the echo signals in an analog form to digital signals, and supplies them to the signal input terminal of a memory unit 33. A reference clock pulse generator 40 produces clock pulses with a predetermined repetition frequency and supplies the pulses to a transmission trigger pulse generator 34, and to one inputs of a distance counter 35 and a direction counter 36. The transmission trigger pulse generator 34 produces a transmission trigger pulse based on the clock pulses from the reference clock pulse generator 40, and supplies the trigger pulse to the antenna 31 and to the other input of the distance counter 35. The distance counter 35 starts in response to the trigger pulse to count the clock pulses from the reference clock pulse generator 40, and supplies its count value to one input of a coordinate converter 37 and is cleared to zero in count value every time its count reaches a count value corresponding to the detection range set. The direction counter 36 starts in response to a start signal supplied from the antenna 31 to count the clock pulses from the clock pulse generator 40, and supplies its count value to the other input of the coordinate converter 37, and is cleared to zero every time its count reaches a count value corresponding to an angle of 360 degrees. The coordinate converter 37 produces X- and Y-address signals based on the output signals from the distance counter 35 and the direction counter 36, and supplies these signals to the memory unit 3 through an address switch 38. The coordinate converter 37 is constructed and operated in the same manner as the converters 7 and 17. The memory unit 33 includes m×n semiconductor RAM(random access memory) elements arranged in m columns and n rows, with the number of RAM elements being the same as that of the picture elements of the screen of a cathode-ray tube indicator 39 wherein the picture elements are also arranged in m columns and n rows. Each memory element of the memory unit 33 consists of, for exampple one bit. The memory unit 33 writes the output signal from the analog-to-digital converter 32(hereinafter referred to as "A-D converter") into the storage location determined by X- and Y-address signals supplied from the coordinate converter 37.

The output signals of the memory unit 33 are supplied to the input terminal of a digital-to-analog converter 51, and also to the signal input terminal of a memory unit 53 through a delay circuit 54 and an OR gate 55. The output signals of the memory unit 53 are supplied to the input terminal of the digital-to-analog converter 51(hereinafter referred to as "D-A converter"), and also to the signal input terminal of the memory unit 53 through a delay circuit 56 and the OR gate 55. As the antenna 31 continues to rotate, the resultant echo signals reflected by a bird or a group of birds based on the search signals radiated during a plurality of rotations of the antenna 31 will be successively written into the memory unit 53.

A clock pulse generator 41 supplies clock pulses to an X-axis counter 42, the address switch 38, the read/write terminal of the memory unit 33, and the read/write terminal of the memory unit 53. The X-axis counter 42 repetitiously counts m clock pulses and transmits an output pulse to a Y-axis counter 43 every time its count reaches m, and supplies its count to the memory unit 33 through the address switch 38 and also to the memory unit 53, and further supplies horizontal synchronous signals to a deflection circuit 44. The Y-axis counter 43 repetitiously counts n clock pulses, supplies its count to the memory unit 33 through the address switch 38 and also to the memory unit 53, and further supplies vertical signals to the deflection circuit 44. The memory units 33 and 53 separately read stored signals from the memory elements determined by the count outputs from the X-axis and Y-axis counters 42 and 43. The address switch 38 comprises an electric switching device, and supplies either the X- and Y-address signals from the coordinate converter 37 or the counts from the X-axis and Y-axis counters 42 and 43 depending on the polarity of the clock pulses from the clock pulse generator 41. When the X- and Y-address signals from the coordinate converter 37 are supplied to the memory unit 33 and a write signal is applied to the read/write terminal of the memory unit 33 from the clock pulse generator 41, the output signal from the A-D converter 32 is written into a memory element determined by the X- and Y-address signals. On the other hand, when the count outputs from the X-axis and Y-axis counters 42 and 43 are supplied to the memory unit 33 through the address switch 38 and a read signal is applied to the read/write terminal of the memory unit 33, the stored signal is read out from the memory element determined by the count outputs from the X-axis and Y-axis counters 42 and 43 and applied to the input of the D-A converter 51, and also supplied to the input of the memory unit 53 through the delay circuit 54 and the OR gate 53.

The output signals read out from the memory unit 53 are supplied to the input of the D-A converter 51, and also to the delay circuit 56 in which the signals are delayed. When a write signal is applied to the read/write terminal of the memory unit 53, the output signal of the delay circuit 56 is written into a memory element of the memory 53 determined by the count outputs from the X-axis and Y-axis counters, and thus written into the same memory element from which the same signal is read out. As a result, the antenna 31 continues to rotate, the resultant echo signals reflected by a bird or a group of birds based on the search signals radiated during a plurality of rotations of the antenna 31 will be successively written into the memory unit 53.

Figure 4:
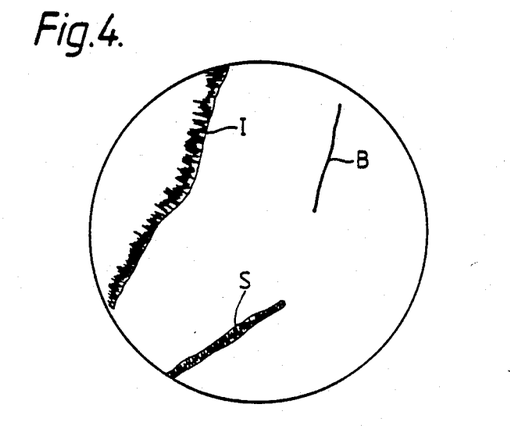
FIG. 4 shows a display example presented by the embodiment shown in FIG. 3.

The output signal of the D-A converter 51 is supplied to the brilliance control input terminal of the cathode-ray tube indicator 39. The electron beam of the indicator 39 is deflected horizontally in synchronism with the horizontal synchronous signals and also deflected vertically in synchronism with the vertical synchronous signals, so that the whole surface of the cathode-ray tube indicator 39 is swept. The output signals of the memory units 33 and 53 are indicated on the screen of the indicator 39 as shown in FIG. 4 wherein I represents an island, S denotes the track of a ship, and B represents the track of a bird or a group of birds. As apparant, the track of a bird or birds can be clearly distinguished from the track of a ship, since the width of the track of birds is narrower than that of the track of a ship.

Figure 5:
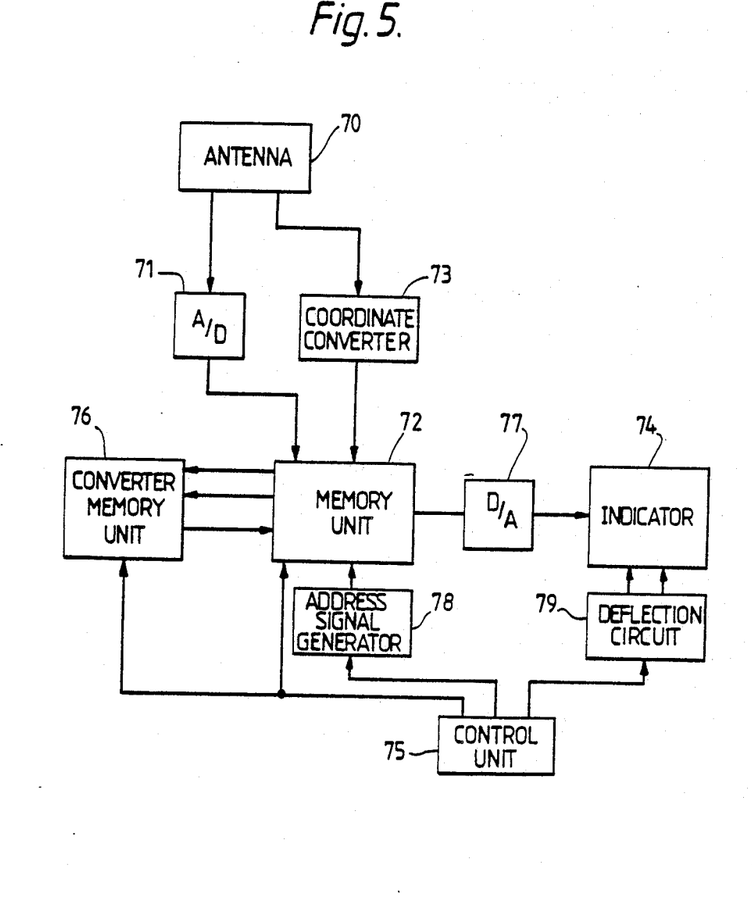
FIG. 5 shows a schematic block diagram of another embodiment according to the invention.

Referring to FIG. 5, an antenna 70 is rotated at a constant speed and radiates radio pulse signals of a frequency in the S-band frequency range successively in different azimuthal directions through 360 degrees, and receives echo signals of the frequency reflected by objects. The received echo signals are supplied to an A-D converter 71 which converts the echo signals in an analog form into digital signals and supplies the resultant signals to a signal input of a memory unit 72. A coordinate converter 73 produces X- and Y-address signals based on the range signals and the angle signals supplied from the antenna unit, and supplies the address signals to another input of the memory unit 72. The memory unit 72 includes m×n semi-conductor RAM elements arranged in m columns and n rows, with the number of RAM elements being the same as that of the picture elements of the screen of a cathode-ray tube indicator 74. Each memory element of the memory unit 72 consists of, for example three bits. The memory unit 72, controlled by a control unit 75, transfers the output signal of the A-D converter 71 to an input terminal of a converter memory unit 76, reads a stored signal from a memory element determined by the X- and Y-address signals supplied from the coordinate converter 73, supplies it to the converter 76, and writes the output signal of the converter memory unit 76 into the same memory element represented by the X- and Y-address signals, and reads out a stored signal therefrom to be supplied to a digital-to-analog converter 77. The converter memory unit 76 comprises semiconductor ROM(read only memory) elements which has stored the following conversion table therein.

| Newly Received Echo Signal | Previously Received and Stored Echo Signal | | | | | | | |
|---|---|---|---|---|---|---|---|---|
| | 0 | 1 | 2 | 3 | 4 | 5 | 6 | 7 |
| 0 | 0 | 0 | 0 | 0 | 0 | 0 | 0 | 0 |
| 1 | 1 | 1 | 1 | 1 | 1 | 1 | 1 | 1 |
| 2 | 1 | 2 | 2 | 2 | 2 | 2 | 2 | 2 |
| 3 | 2 | 2 | 3 | 3 | 3 | 3 | 3 | 3 |
| 4 | 2 | 3 | 3 | 4 | 4 | 4 | 4 | 4 |
| 5 | 3 | 3 | 4 | 4 | 5 | 5 | 5 | 5 |
| 6 | 3 | 4 | 4 | 5 | 5 | 6 | 6 | 6 |
| 7 | 4 | 4 | 5 | 5 | 6 | 6 | 7 | 7 |

The converter memory unit 76 receives a newly caught echo signal from the A-D converter 71 and a stored signal read out from the memory unit 72, produces an output signal based on these two signals in accordance with the conversion table, and supplies the resultant output signal to another input terminal of the memory unit 72, controlled by the control unit 75. The output signal from the unit 76 is written into the same memory element determined by the X- and Y-address signals from the coordinate converter 73.

Figure 6A:
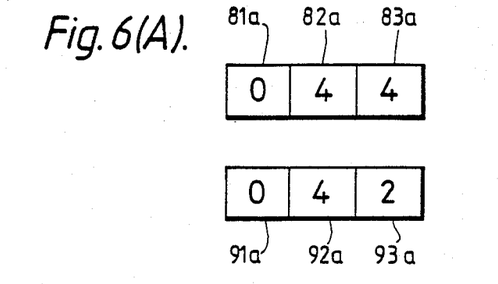
FIG. 6 shows diagrams for explaining the relationship between received echo signals and the brilliance of the corresponding displayed images.
Figure 6B:
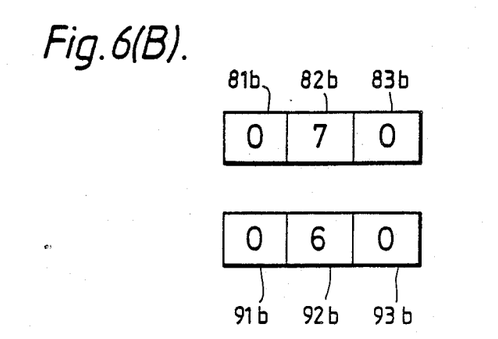

Referring to FIG. 6(A), each of the numerals "0", "4" and "4" in each one of blocks 81a, 82a and 83a represents the amplitude of the received echo signal supplied to the memory unit 72 from the D-A converter 71 and stored in three memory elements of the unit 72. While, each of the numerals "0", "4" and "2" in each one of blocks 91a, 92a and 93a represents the brilliance degree of the corresponding one of picture elements in the screen of the indicator 74. It is first assumed that the echo signals stored in three memory elements of the memory unit 72 have been "0", "0" and "0" respectively. When a first series of the echo signals represented as "0", "7" and "4" supplied to the converter memory unit 76 from the A-D converter 71 through the memory unit 72, the echo signals represented as "0", "7" and "4" are respectively compared with the signals represented as "0", "0" and "0" read out from the memory unit 72 and supplied to the converter memory unit 76, thereby producing the signals, in accordance with the conversion table, respectively represented as "0", "4" and "2" respectively shown in the blocks 91a, 92 and 93a. Here, the echo signal reflected by a bird is represented as "7", and the echo signal reflected by waves of the water is represented as "4". Hence, the echo signal from the bird is indicated at a brilliance level "4", and the echo signal from the waves of the water is displayed at a brilliance level "2". The resultant signals represented as "0", "4" and "2" are also stored in the same three memory elements. Then, when the antenna rotates one more time, a second series of the echo signals reflected by the bird and the water waves represented as "0", "7" and "0" as shown in FIG. 6(B) are received and supplied to the converter memory unit 76 through the memory unit 72, with the signal level "7" representing the echo signal from the bird and the echo signal level "0" representing the echo signals from the water waves. In the same manner as above, the signals represented as "0", "4" and "2" stored in the three memory elements are read out and supplied to the converter memory unit 76, and are compared with the newly received echo signals represented as "0", "7" and "0" in accordance with the conversion table. As a result, the signals represented as "0", "6" and "0" are produced by the converter memory unit 76 and transmitted to the indicator 74, and at the same time are stored in the same three memory elements in the memory unit 72 respectively. The bird is displayed at a brilliance level "6", and the water waves are indicated at a level "0". Thus, the bird is displayed conspicuously with respect to the sea clutter, as the bird is emphasized and the echo signals reflected by the water waves disappear. This is because the echo signal from the bird is received every rotation of the antenna, while the echo signals from the water waves are intermittently received as well known.

The control unit 75 comprises, for example, a clock pulse generator and frequency dividers. A read X- and Y-address signals generator 78 may comprise a X-axis and a Y-axis counters, and produces X- and Y-address signals based on the signals from the control unit 75. The control unit 75 also supplies horizontal and vertical synchronous signals to a deflection circuit 79. The deflection circuit 79 deflects the electron beam of the indicator 74 horizontally and vertically based on the horizontal and vertical signals, so that the whole indicating surface of the indicator 74 is swept. The signals stored in the memory unit 72 and read out therefrom are supplied to the brilliance control terminal of the indicator 74, and displayed as emphasized on the screen thereof. The bird or birds are easily perceived on the screen to locate them so that a fish school under the bird is detected. The following conversion table can also be incorporated in the converter memory unit 76. When this conversion table is used, the bird image is still more emphasized with respect to the sea clutter.

| Newly Received Echo Signal | Previously Received Signal Stored Echo Signal | | | | | | | |
|---|---|---|---|---|---|---|---|---|
| | 0 | 1 | 2 | 3 | 4 | 5 | 6 | 7 |
| 0 | 0 | 0 | 0 | 0 | 0 | 0 | 0 | 0 |
| 1 | 1 | 1 | 1 | 1 | 1 | 1 | 1 | 1 |
| 2 | 1 | 2 | 2 | 2 | 2 | 2 | 2 | 2 |
| 3 | 1 | 2 | 3 | 3 | 3 | 3 | 3 | 3 |
| 4 | 1 | 2 | 3 | 4 | 4 | 4 | 4 | 4 |
| 5 | 1 | 2 | 3 | 4 | 5 | 5 | 5 | 5 |
| 6 | 1 | 2 | 3 | 4 | 5 | 6 | 6 | 6 |
| 7 | 1 | 2 | 3 | 4 | 5 | 6 | 7 | 7 |

Figure 7:
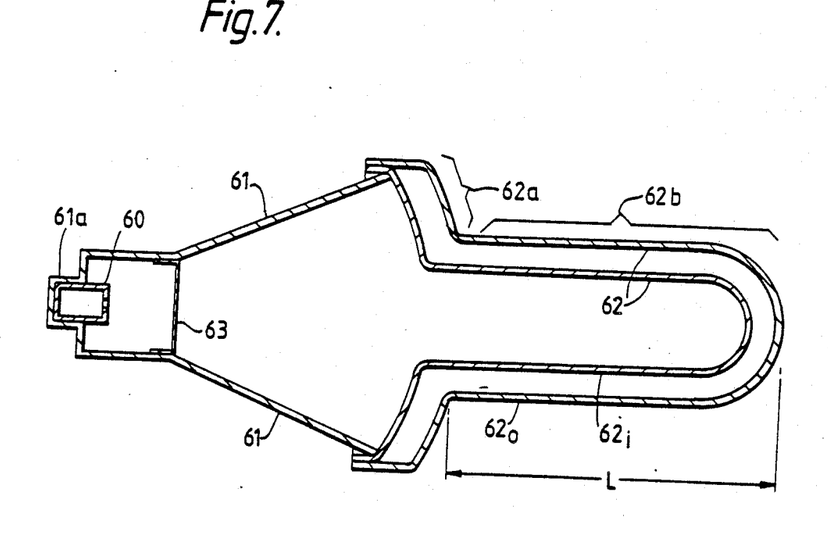
FIG. 7 shows the sectional view of the construction of the antenna used in the embodiments shown in FIGS. 1, 3 and 6.

Referring to FIG. 7, the antenna comprises a slot waveguide 60 as the wave source, a horn 61 made of metal material, and a protruded cover 62 made of dielectric such as, for example, glass fiber reinforced plastic. The slot waveguide 60 has slots formed in one shorter side of the rectangular waveguide. The slots function as radiating elements. The slot waveguide 60 is mounted on the base part 61a of the horn 61. The horn 61 operates so as to direct the waves radiated from the slot waveguide 60 in one direction. The dielectric cover 62 is attached to the opening of the horn 61 in a way to cover the opening, and functions to further concentrate the electromagnetic waves which have been directed by the horn 61. The dielectric cover 62 comprises an inner curved dielectric sheet 62i and an outer curved dielectric sheet 62o. The inner and outer dielectric sheets are spaced at some distance intervals therebetween along the whole length of the curved sheet. The inner and outer curved dielectric sheets are formed in such a way that both end parts thereof are shaped as arcs 62a the mid point of which being at the waveguide 60, and the middle portion thereof is protruded, and the top portion of the protruded dielectric cover is rounded as shown. Both end portions of the outer dielectric sheet are straightened and fixed to the end portions of the metal horn through the end portions of the inner dielectric sheet 62i. Air is filled between the inner and outer dielectric sheets. It should be noted that foam urethane can also be filled therebetween in place of air. A grid 63 functions to suppress orthogonal polarized electro-magnetic radiation. It should also be noted that although the end portions of the cover 62 are shaped in a form of arcs in the foregoing embodiment, straightened sheet of dielectric can also be used in these parts in place of the arc shaped ones.

This construction of the antenna presents improved vertical directional characteristics without extending the length of the protruded part represented as "L".

While the invention has been described in detail and with reference to specific embodiments thereof, it will be apparent to one skilled in the art that various changes and modifications can be made therein without departing from the spirit and scope of the invention.

What is claimed is:
1. A fish school detecting method, comprising:
 (i) radiating search signals with their carrier frequency being in the S-band frequency range from an antenna, successively in different azimuthal directions within a wide angular range,
 (ii) receiving an echo signal reflected by a bird or birds and indicative of the location of a school of fish,
 (iii) processing echo signals received during a plurality of rotations of the antenna so that the echo signals reflected by the bird are emphasized, and
 (iv) displaying the resultant processed signals representative of the location of said bird or birds and therefore indicative of the location of said school of fish on the screen of an indicator, thereby locating and detecting the school of fish under the bird or birds.

2. A fish school detecting method as defined in claim 1 wherein the step of processing the echo signals comprises storing the echo signals received during a plurality of rotations of the antenna successively in a memory unit.

3. A fish school detecting method as defined in claim 1 wherein the step of processing the echo signals comprises comparing a newly received echo signal and the corresponding signal which was received during the previous rotation of the antenna and was stored in a memory unit, to produce a processed signal in accordance with a predetermined relationship between the newly received echo signal and the corresponding stored signal, said step of processing emphasizing processed signals representative of the location of a bird or birds while attenuating processed signals representative of intermittent echo signals which may be caused by waves.

4. A fish school detecting method, comprising:
(i) radiating search signals with their carrier frequency being in the X-band frequency range, successively in different azimuthal directions within a wide angular range,
(ii) radiating search signals with their carrier frequency being in the S-band frequency range, successively in different azimuthal directions within a wide angular range,
(iii) receiving echo signals with the X-band carrier frequency reflected by objects,
(iv) receiving echo signals with the S-band carrier frequency reflected by the objects,
(v) displaying the received echo signal of said X-band carrier frequency on the screen of an indicator in a first color,
(vi) displaying the received echo signal of said S-band carrier frequency on the screen of an indicator in a second color different from said first,
of said steps (iii) and (iv) of receiving, only said step (iv) of receiving echo signals with the S-band carrier receiving substantial reflections of a bird or birds indicative of the presence of a school of fish,
said steps (v) and (vi) of displaying commonly displaying substantial objects, only said step (vi) of displaying displaying a bird or birds indicative of the location of a school of fish, the bird or birds thereby being displayed in a different color than that of substantial objects.

5. A fish school detecting method, comprising:
(i) radiating search signals with their carrier frequency being in the S-band frequency range, successively in different azimuthal directions within a wide angular range,
(ii) receiving an echo signal reflected by a bird or birds and indicative of the location of a school of fish, and
(iii) displaying the received echo signal representative of the location of said bird or birds and therefore indicative of the location of said school of fish on the screen of an indicator, thereby locating and detecting the school of fish under the bird or birds.

6. A fish school detecting apparatus, comprising:
(i) transmitting means for radiating search signals with their carrier frequency being in the S-band frequency range from an antenna, successively in different azimuthal directions within a wide angular range,
(ii) receiving means for receiving an echo signal reflected by a bird or birds and indicative of the location of a school of fish,
(iii) processing means for processing echo signals received during a plurality of rotations of the antenna so that the echo signals reflected by the bird are emphasized to develop processed signals representative of the location of said bird or birds and therefore indicative of the location of said school of fish, and
(iv) an indicator for displaying the resultant processed signals on the screen thereof, thereby locating the bird or birds and thus detecting the school of fish therebeneath.

7. A fish school detecting apparatus as defined in claim 6 wherein the processing means comprises storing means for storing the echo signals received during a plurality of rotations of the antenna.

8. A fish school detecting apparatus as defined in claim 6 wherein the processing means comprises signal producing means for comparing a newly received echo signal and the corresponding signal which was received during the previous rotation of the antenna and stored in storing means, to produce a processed signal in accordance with a predetermined relationship between the newly received echo signal and the corresponding stored signal, said step of processing emphasizing processed signals representative of the location of a bird or birds while attenuating processed signals representative of intermittent echo signals which may be caused by waves.

9. A fish school detecting apparatus, comprising:
(i) first transmitting and receiving means for radiating search signals with their carrier frequency being in the X-band frequency range, successively in different azimuthal directions within a wide angular range, and for receiving echo signals reflected by objects,
(ii) second transmitting and receiving means for radiating search signals with their carrier frequency being in the S-band frequency range, successively in different azimuthal directions within the wide angular range, and for receiving echo signals reflected by the objects, only said second transmitting and receiving means receiving echo signals substantially reflected from a bird or birds indicative of the presence of a school of fish,
(iii) first storage means for storing the echo signals received by said first transmitting and receiving means,
(iv) second storage means for storing the echo signals received by said second transmitting and receiving means,
(v) means for displaying the received echo signal of said X-band carrier frequency, stored in said first storage means in a first color and for displaying the received echo signal of said S-band carrier frequency stored in said second storage means in a second color different from said first, said means for displaying commonly displaying substantial objects, only said received echo signals of said S-band carrier frequency displaying a bird or birds indicative of the location of a school of fish, the bird or birds thereby being displayed in a different color than substantial objects.

10. A fish school detecting apparatus, comprising:
(i) transmitting means for radiating search signals with their carrier frequency being in the S-band frequency range, successively in different azimuthal directions within a wide angular range, (ii) receiving means for receiving an echo signal reflected by a bird or birds and indicative of the location of said school of fish, and (iii) an indicator for displaying the received echo signal on the screen thereof so that the bird or birds are located and the school of fish located thereunder is thereby detected.

11. A fish school detecting apparatus as defined in claim 6 wherein the antenna comprises
   (i) a horn made of metal material,
   (ii) a slot waveguide mounted on the base part of said horn, and
   (iii) a protruded cover made of dielectric material, which is fixedly attached to the opening of said horn.

12. A fish school detecting apparatus as defined in claim 9 wherein the antenna comprises
   (i) a horn made of metal material,
   (ii) a slot waveguide mounted on the base part of said horn, and
   (iii) a protruded cover made of dielectric material, which is fixedly attached to the opening of said horn.

13. A fish school detecting apparatus as defined in claim 10 wherein the antenna comprises
   (i) a horn made of metal material,
   (ii) a slot waveguide mounted on the base part of said horn, and
   (iii) a protruded cover made of dielectric material, which is fixedly attached to the opening of said horn.

14. The fish school detecting method of claim 4 further comprising the steps of:
   (a) producing first write address signals based on the direction and range of the received echo signals of the X-band carrier frequency,
   (b) producing second write address signals based on the direction and range of the received echo signals of the S-band carrier frequency,
   (c) storing the received echo signals of the X-band carrier frequency controlled by the first write address signals,
   (d) storing the received echo signals of the S-band carrier frequency controlled by the second write address signals,
   (e) reading the stored signals of the X- and S-band frequencies, and
   said steps (v) and (vi) of displaying being responsive to said step (e) of reading.

15. The fish school detecting apparatus of claim 9 further comprising:
   first coordinate converting means for producing output signals based on the direction and range of the echo signals received by said first transmitting and receiving means;
   second coordinate converting means for producing output signals based on the direction and range of the echo signals received by said second transmitting and receiving means;
   first writing means for writing output signals from said first receiving means into said first storage means controlled by the output signals from said first coordinate converting means;
   second writing means for writing output signals from said second receiving means into said second storage means controlled by the output signals from said second coordinate converting means;
   reading means for reading out stored signals from said first and second storage means;
   said means for displaying being responsive to the read out storage signals from said reading means.

16. An antenna for transmitting and receiving certain band frequencies comprising:
   wave source means for producing an energy wave of a certain band frequency;
   direction means, operatively connected to said wave source means for directing radiation of said energy wave from said wave source means in one primary direction; and
   cover means, operatively connected to said direction means, for concentrating said energy wave;
   said cover means including,
   an inner cover of dielectric material, and
   an outer cover of dielectric material;
   said inner and outer covers being spaced at a predetermined interval from each other along substantially the entirety of said cover means;
   said inner and outer covers each including
   a generally arcuate peripheral portion fixed to said direction means, and
   a center portion extending from a center edge of said generally arcuate peripheral portion and provided with a generally cylindrical wall and an arcuate cap,
   said generally arcuate peripheral portion, said wall, and said cap of said center portion, of each of said inner and outer covers being formed of a single dielectric sheet.

17. The antenna as claimed in claim 16, wherein said wave source means comprises:
   a waveguide for guiding said energy wave, said waveguide having an emitting surface; and
   radiating means, operatively connected to said waveguide for radiating said energy wave, said radiating means being a slot formed in said emitting surface.

18. The antenna as claimed in claim 16 further comprises foam urethane filler positioned in said predetermined interval.

* * * * *